(12) United States Patent
Johnson

(10) Patent No.: US 7,498,783 B2
(45) Date of Patent: Mar. 3, 2009

(54) EXTENDING THE CONTINUOUS MODE OF OPERATION FOR A BUCK CONVERTER

(75) Inventor: Brian P. Johnson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 11/175,571

(22) Filed: Jul. 6, 2005

(65) Prior Publication Data

US 2007/0007935 A1    Jan. 11, 2007

(51) Int. Cl.
*G05F 1/00* (2006.01)

(52) U.S. Cl. .................. 323/282; 323/272; 323/293

(58) Field of Classification Search .................. 323/282, 323/272, 25, 293, 290, 247, 259, 262, 263, 323/251, 328, 344–346, 209–211, 352, 354, 323/269, 268, 271; 363/62; 336/147, 137, 336/144, 146
See application file for complete search history.

(56) References Cited

U.S. PATENT DOCUMENTS

| | | | |
|---|---|---|---|
| 4,674,019 A | 6/1987 | Martinelli | 363/20 |
| 4,864,478 A | 9/1989 | Bloom | 363/16 |
| 5,808,453 A * | 9/1998 | Lee et al. | 323/224 |
| 6,188,209 B1 * | 2/2001 | Poon et al. | 323/255 |
| 6,472,852 B1 | 10/2002 | Lethellier | 323/259 |
| 6,515,457 B1 | 2/2003 | Maniktala | 323/222 |
| 6,847,183 B2 * | 1/2005 | Marioni | 318/700 |
| 6,924,630 B1 * | 8/2005 | Pacala | 323/224 |
| 7,006,362 B2 * | 2/2006 | Mizoguchi et al. | 363/16 |
| 7,095,158 B2 * | 8/2006 | Yun-Xiu et al. | 310/318 |

OTHER PUBLICATIONS

Yang, Bo, *Topology Investigation for Front End DC/DC Power Conversion for Distributed Power System*, pp. 1-332.

* cited by examiner

*Primary Examiner*—Akm E Ullah
*Assistant Examiner*—Harry Behm
(74) *Attorney, Agent, or Firm*—Baker Botts L.L.P.

(57) ABSTRACT

An information handling system has a power supply using a DC-to-DC buck converter. The DC-to-DC buck converter maintains continuous mode of operation over a wide range of output currents by adding more inductance to the buck converter circuit when the load current is below a certain value (s). A sensing circuit may determine load current and at the certain value(s) more inductance (increased inductance value) may be added to the buck converter circuit so as to main a continuous mode of operation. When the load current increases above the certain value, the extra inductance may be removed (inductance value decreased). Thus, the buck converter may operate most efficiently and remain in the continuous operation mode for a wider range of load currents.

13 Claims, 7 Drawing Sheets

Figure 2 (Prior Technology)

EXTENDING THE CONTINUOUS MODE OF OPERATION FOR A BUCK CONVERTER

TECHNICAL FIELD

The present disclosure relates generally to information handling systems, and more particularly, to power supplies of the information handling system.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

The information handling system comprises a plurality of subsystems, e.g., processor blades, disk controllers, etc., these subsystems operate at certain direct current (DC) voltages and currents. Generally, these DC voltages and currents may be supplied through at least one power supply, preferably, at least two power supplies for redundancy purposes. A common and economical power supply that may be used to produce the DC voltages and currents required by the information handling subsystems may be a DC-to-DC buck converter. The DC-to-DC buck converter may step down an input DC voltage to a lower DC output voltage.

SUMMARY

When the load current to a buck converter decreases below a critical value, the buck converter will switch operating modes from continuous to discontinuous. A discontinuous mode of operation increases the ripple current that must be filtered by the output capacitance. An increase in output filter capacitance is therefore needed to properly filter this increase in ripple current. As the load current decreases while the buck converter is in the discontinuous mode of operation, the longer the output capacitance charge needs to support this low output load at a constant voltage. Thus, an increase in capacitance is required to minimize loss of voltage regulation as the buck converter supplies less charging current from the series inductor.

The continuous mode of operation of a buck converter is dependent upon the inductance value (size) of the output inductor. The lower the output current load, the larger the inductor value needs to be in order to maintain the continuous mode of operation (e.g., full cycle charge and discharge of the inductor). According to specific example embodiments of this disclosure, more inductance is added to the buck converter circuit when the load current is below a certain value(s). A sensing circuit may determine load current and at the certain value(s) more inductance (increase inductance value) may be added to the buck converter circuit so as to main a continuous mode of operation. When the load current increases above the certain value, the extra inductance may be removed (inductance value decreased). Thus, the buck converter may operate most efficiently and remain in the continuous operation mode for a wider range of load currents.

An apparatus for extending a continuous mode of operation for a buck converter, according to a specific example embodiment of this disclosure, comprises: a charge switch adapted for coupling to a direct current voltage source; a first inductor coupled to the charge switch; a discharge switch coupled to the charge switch and the first inductor; a second inductor; a disconnect switch adapted for coupling the second inductor in parallel with the first inductor; a filter capacitor coupled to the first inductor and the disconnect switch; and a current sense and inductor selection circuit, wherein the current sense and inductor selection circuit measures output load current from the buck converter and controls operation of the disconnect switch such that the first and second inductors are coupled in parallel when the measured output load current is greater than a certain current value. The certain current value may be a minimum current value required for the buck converter to operate in the continuous mode.

An apparatus for extending a continuous mode of operation for a buck converter, according to another specific example embodiment of this disclosure, comprises: a charge switch adapted for coupling to a direct current voltage source; a first inductor coupled to the charge switch; a discharge switch coupled to the charge switch and the first inductor; a plurality of second inductors; a plurality of disconnect switches adapted for coupling the plurality of second inductors in parallel with the first inductor; a filter capacitor coupled to the first inductor and the disconnect switch; and a current sense and inductor selection circuit, wherein the current sense and inductor selection circuit measures output load current from the buck converter and controls operation of the plurality of disconnect switches such that appropriate ones of the plurality of second inductors are coupled in parallel with the first inductor such that the buck converter operates in a continuous mode for the measured output load current. The apparatus may further comprise a voltage sense and inductor control circuit for measuring an output voltage from the buck converter and for controlling operation of the plurality of disconnect switches such that appropriate ones of the plurality of second inductors are coupled in parallel with the first inductor such that the buck converter operates in the continuous mode for the measured output voltage.

An apparatus for extending a continuous mode of operation for a buck converter, according to yet another specific example embodiment of this disclosure, comprises: a charge switch adapted for coupling to a direct current voltage source; a first inductor coupled to the charge switch; a discharge switch coupled to the charge switch and the first inductor; a second inductor; a disconnect switch adapted for coupling the second inductor in series with the first inductor; a filter capacitor coupled to the first inductor and the disconnect switch; and a current sense and inductor selection circuit, wherein the current sense and inductor selection circuit measures output load current from the buck converter and controls operation of the disconnect switch such that the first and second inductors are coupled in series when the measured output load current is less than a certain current value. The certain current value may be a minimum current value required for the buck converter to operate in the continuous mode.

An apparatus for extending a continuous mode of operation for a buck converter, according to still another specific example embodiment of this disclosure, comprises: a charge switch adapted for coupling to a direct current voltage source; a first inductor coupled to the charge switch; a discharge switch coupled to the charge switch and the first inductor; a plurality of second inductors; a plurality of disconnect switches adapted for coupling the plurality of second inductors in series with the first inductor; a filter capacitor coupled to the first inductor and the disconnect switch; and a current sense and inductor selection circuit, wherein the current sense and inductor selection circuit measures output load current from the buck converter and controls operation of the plurality of disconnect switches such that appropriate ones of the plurality of second inductors are coupled in series with the first inductor such that the buck converter operates in a continuous mode for the measured output load current. The apparatus may further comprise a voltage sense and inductor control circuit for measuring an output voltage from the buck converter and for controlling operation of the plurality of disconnect switches such that appropriate ones of the plurality of second inductors are coupled in parallel with the first inductor such that the buck converter operates in the continuous mode for the measured output voltage.

A method for extending a continuous mode of operation for a buck converter, according to another specific example embodiment of this disclosure, comprises: coupling a charge switch to a direct current voltage source; charging a first inductor with the charge switch; discharging the first inductor with a discharge switch; filtering an output voltage of the first inductor with a filter capacitor; and coupling a second inductor in parallel with the first inductor when an output load current is greater than a certain current value. The certain current value may be a minimum current value required for the buck converter to operate in the continuous mode. An information handling system, according to a specific example embodiment of this disclosure, may have a power supply according to this buck converter.

A method for extending a continuous mode of operation for a buck converter, according to another specific example embodiment of this disclosure, comprises: coupling a charge switch to a direct current voltage source; charging a first inductor with the charge switch; discharging the first inductor with a discharge switch; filtering an output voltage of the first inductor with a filter capacitor; and coupling appropriate ones of a plurality of second inductors in parallel with the first inductor such that the buck converter operates in a continuous mode for an output load current.

A method for extending a continuous mode of operation for a buck converter, according to another specific example embodiment of this disclosure, comprises: coupling a charge switch to a direct current voltage source; charging a first inductor with the charge switch; discharging the first inductor with a discharge switch; filtering an output voltage of the first inductor with a filter capacitor; and coupling a second inductor in series with the first inductor when an output load current is less than a certain current value. The certain current value may be a minimum current value required for the buck converter to operate in the continuous mode.

A method for extending a continuous mode of operation for a buck converter, according to another specific example embodiment of this disclosure, comprises: coupling a charge switch to a direct current voltage source; charging a first inductor with the charge switch; discharging the first inductor with a discharge switch; filtering an output voltage of the first inductor with a filter capacitor; and coupling appropriate ones of a plurality of second inductors in series with the first inductor such that the buck converter operates in a continuous mode for an output load current.

A method for extending a continuous mode of operation for a buck converter, according to another specific example embodiment of this disclosure, comprises: charging a variable inductor from a voltage source; discharging the variable inductor; filtering an output voltage from the variable inductor with a filter capacitor; and increasing or decreasing the variable inductor such that the buck converter operates in a continuous mode for an output load current of the output voltage.

An information handling system may have a power supply comprising a buck converter according to the teaching of this disclosure.

BRIEF DESCRIPTION OF THE DRAWINGS

A more complete understanding of the present disclosure thereof may be acquired by referring to the following description taken in conjunction with the accompanying drawings wherein.

Figure 1:
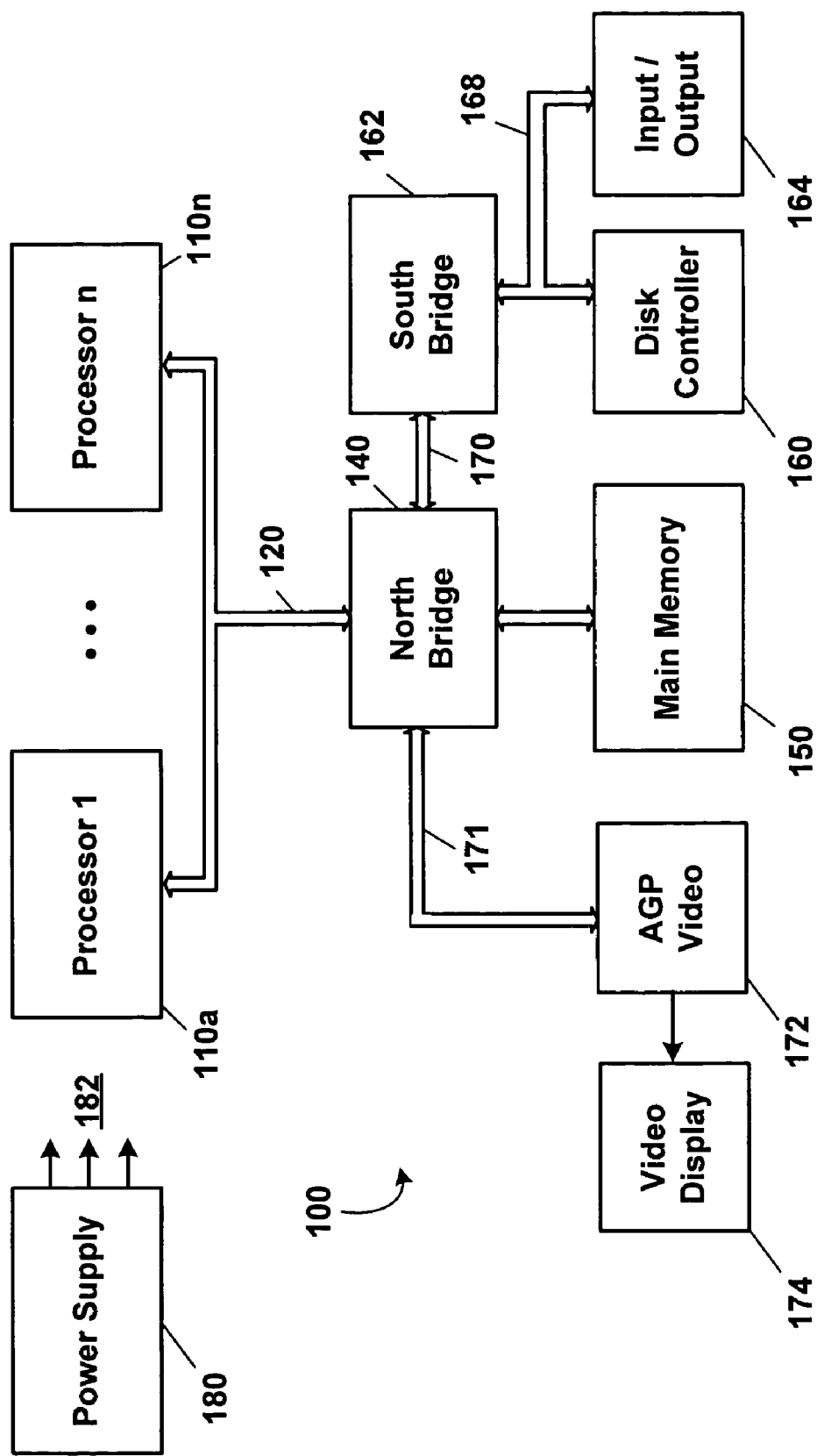
FIG. 1 is a schematic block diagram of an information handling system, according to specific example embodiments of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is an information handling system having electronic components mounted on at least one printed circuit board (PCB) (motherboard) and communicating data and control signals therebetween over signal buses, according to a specific example embodiment of the present disclosure. In one example embodiment, the information handling system is a computer system. The information handling system, generally referenced by the numeral 100, comprises a plurality of physical processors 110, generally represented by processors 110a-110n, coupled to a host bus(es) 120. A north bridge 140, which may also be referred to as a memory controller hub or a memory controller, is coupled to a main system memory 150. The north bridge 140 is coupled to the plurality of processors 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, AGP bus 171 coupled to a video graphics interface 172 which drives a video display 174. A third bus(es) 168 may also comprise other industry standard buses or proprietary buses, e.g., ISA, SCSI, I²C, SPI, USB buses through a south bridge (s) (bus interface) 162. A disk controller 160 and input/output interface 164 may be coupled to the third bus(es) 168. One or more power supplies 180 may supply direct current (DC) voltages the aforementioned components (subsystems) of the information handling system 100, and may comprise, for example, a DC-to-DC buck converter for each voltage required by the subsystems of the information handling system 100.

Figure 2:
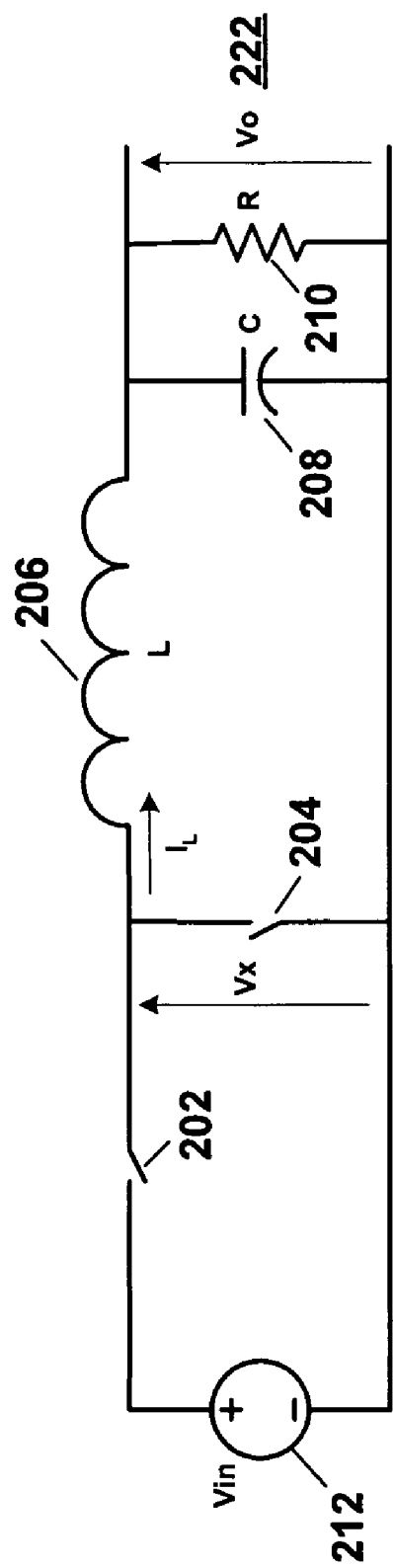
FIG. 2 is a schematic diagram of a prior technology DC-to-DC buck converter.

Referring to FIG. 2, depicted is a schematic diagram of a prior technology DC-to-DC buck converter. A DC-to-DC converter is a device that accepts a DC input voltage and produces a DC output voltage. Typically output voltage 222, Vo, is at a different voltage level than input voltage 212, Vin. The DC-to-DC converter shown in FIG. 2 is a typical DC-to-DC buck converter comprising a charge switch 202, e.g., transistor; a discharge switch 204, e.g., diode; an inductor 206, a filter capacitor 208 and a load represented by resistor 210. Input voltage 212 is applied to one end of inductor 206 when input switch 202 closes. The input voltage 212 causes an increasing current through inductor 206. When charge switch 202 opens and discharge switch 204 closes (automatic when voltage polarity causes diode conduction) current will discharge through the inductor 206. If current flowing through the inductor is continuous, e.g., operating in the continuous mode, and never reaching zero, the output voltage 222 will be proportional to the average of the on time (closed) of the charge switch 202. The longer the time that the charge switch 202 is closed the greater will be the output voltage 222. Defining $T_{on}$ as the on time and $T_{off}$ as the off time of the charge switch 202, a total cycle time may be defined as $T=T_{on}+T_{off}$ and a duty ratio, D, may be defined as $D=T_{on}/T$. The output voltage 222 will be: Vo=Vin*D so as long as the DC-to-DC buck converter can remain in a continuous operating mode.

Figure 3:
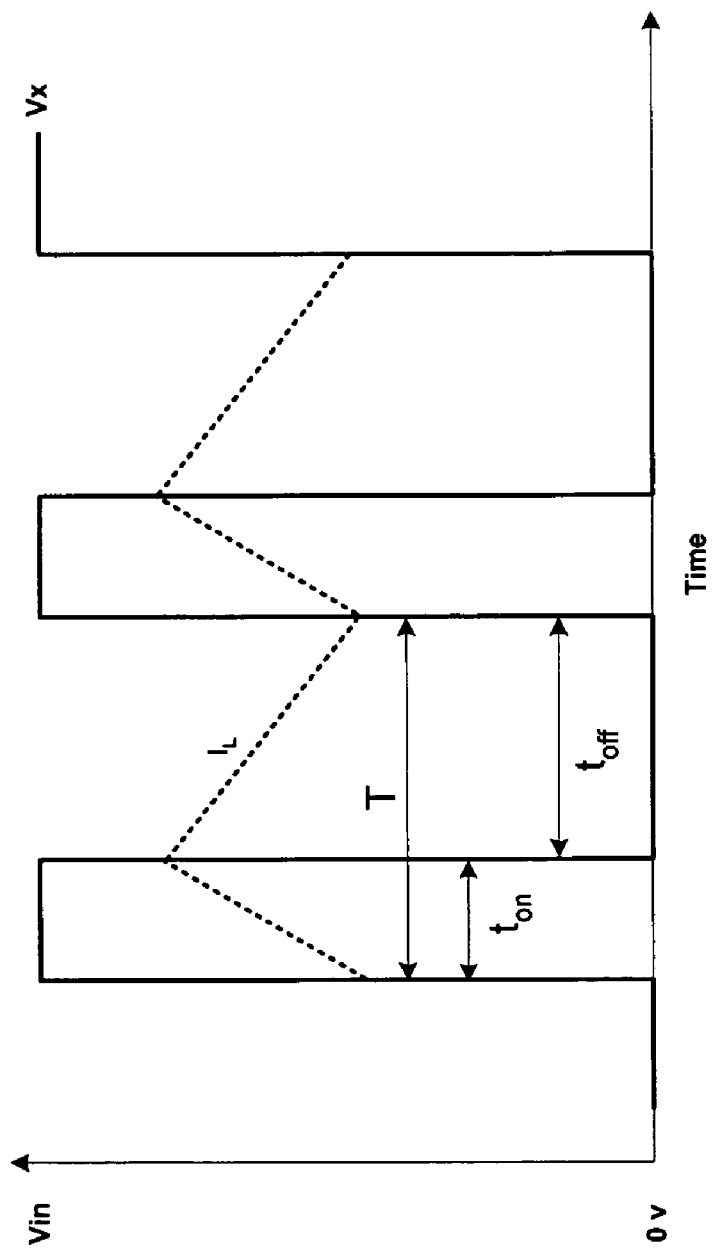
FIG. 3 is a schematic waveform diagram of a typical DC-to-DC buck converter in a continuous operating mode delivering a substantial current to a load.

Referring now to FIG. 3, depicted is a schematic waveform diagram of a typical DC-to-DC buck converter in a continuous operating mode delivering a substantial current to a load. Current always flows in the inductor 206 (both charging and discharging).

Figure 4:
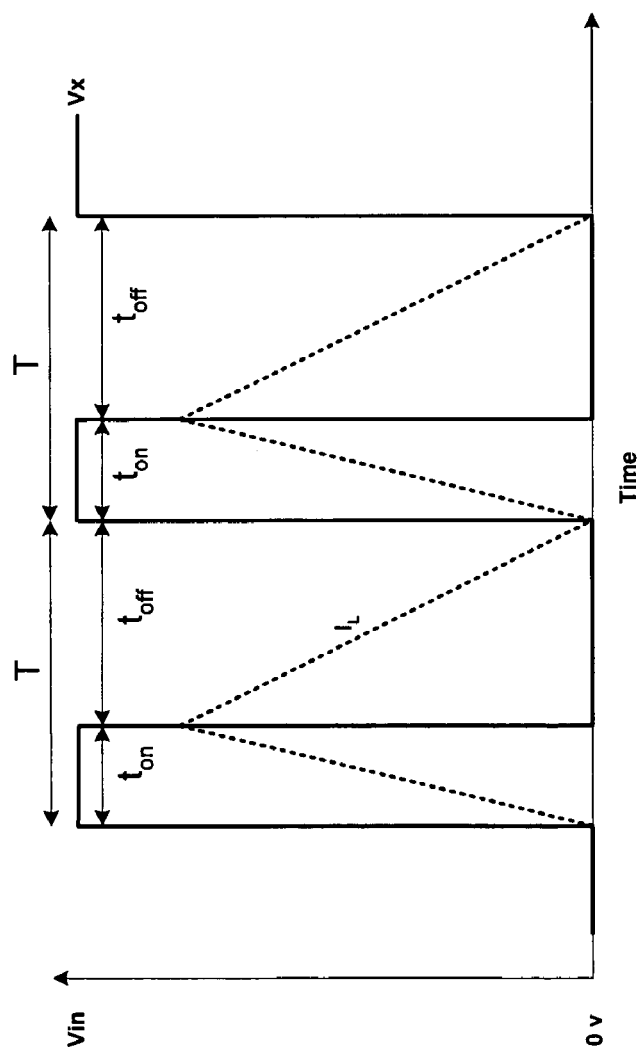
FIG. 4 is a schematic waveform diagram of a typical DC-to-DC buck converter delivering a minimum current to a load while operating in a continuous mode.

Referring to FIG. 4, depicted is a schematic waveform diagram of a typical DC-to-DC buck converter delivering a minimum current to a load while operating in a continuous mode. As the load current becomes less, a point is reached where current through the inductor 206 just reaches zero at the start of $T_{on}$. This is the minimum load current point at which the DC-to-DC buck converter can still operate in a continuous mode. In order to stay in a continuous operating mode for less load current drawn, the inductor 206 must have a higher inductance value. However, increasing the inductance value will limit the maximum load current that the DC-to-DC buck converter may produce.

Figure 5:
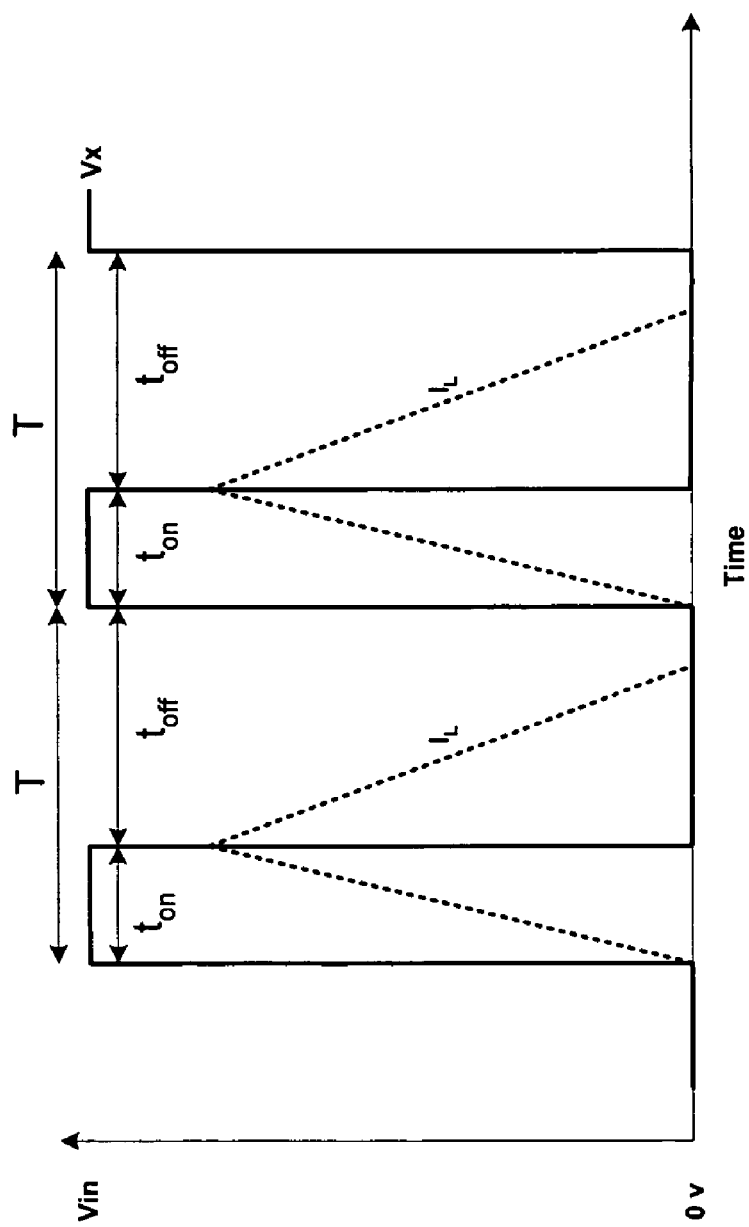
FIG. 5 is a schematic waveform diagram of a typical DC-to-DC buck converter delivering minimal current to a load while operating in a discontinuous mode.

Referring to FIG. 5, depicted is a schematic waveform diagram of a typical DC-to-DC buck converter delivering minimal current to a load while operating in a discontinuous mode. The inductor 206 is not charged up enough (because of low load current drawn) to discharge a continuous current through the entire off time, $T_{off}$, over the full cycle T. This causes discontinuities, e.g., current pulses, that increase the ripple voltage on the filter capacitor 208. A tradeoff in the range of load currents that may be supplied depend on the inductance value of the inductor 206, e.g., smaller inductance values allow greater output load current capacity, whereas, larger inductance values allow operation of the buck converter in a continuous mode for lower output load currents. Heretofore, a compromise had to be made when selecting an inductor value in a DC-to-DC buck converter for a desired, but limited, range of output load currents while maintaining operation in a continuous mode. Operating in a discontinuous mode is not desirable for both ripple reduction and voltage regulation.

Figure 6:
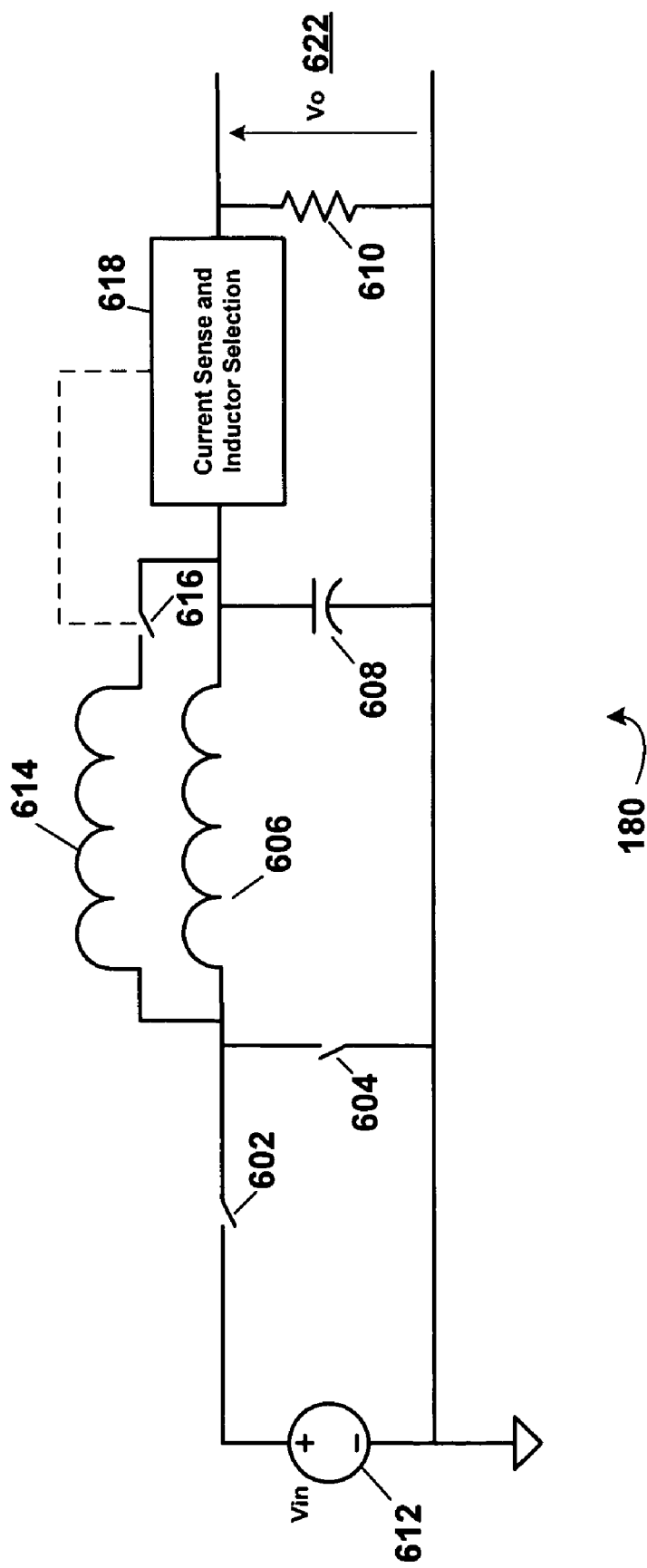
FIG. 6 is a schematic diagram of a DC-to-DC buck converter according to a specific example embodiment of the present disclosure.

Referring to FIG. 6, depicted is a schematic diagram of a DC-to-DC buck converter according to a specific example embodiment of the present disclosure. A DC-to-DC buck converter, generally represented by the numeral 180, comprises a charge switch 602, a discharge switch 604, a first inductor 606, a second inductor 614, a disconnect switch 616, a filter capacitor 608, and a current sense and inductor selection circuit 618. During normal relatively high output current loads, the disconnect switch 616 is closed, effectively connecting inductor 614 in parallel with inductor 606. When the two inductors 606 and 614 are in parallel the inductance value thereof is smaller than either inductance value of the inductors 606 and 614, and the current carrying capacity is the sum of the current carrying capacities of each inductor 606 and 614. This configuration is optimal for a range of higher load currents. The output voltage 622 will be less than the input voltage 612.

When the load current drops to a point that would be near the end of the continuous operating mode for the parallel connected inductors 606 and 614, the current sense and inductor selection circuit 618 may cause disconnect switch 616 to open, thus disconnecting the inductor 614 from the buck converter 180. In this case, the inductance value is that of the inductor 606 only and is higher than the inductance value of the parallel connected combination of inductors 606 and 614. This configuration may extend the low end range of load current demand such that the buck converter 180 remains in a continuous operating mode. As the load current increases to a certain higher value, the current sense and inductor selection circuit 618 may cause the disconnect switch 616 to close, thus decreasing the inductance value (both inductors 606 and 614 connected in parallel) and may thereby increase the high end load current available from the buck converter 180.

It is contemplated and within the scope of the present disclosure that the current sense and inductor selection circuit 618 may also sense current through the charge switch 602, the discharge switch 604, the inductor 606 and/or the inductor 614 when determining whether the buck converter 180 is operating in a continuous or discontinuous mode so that appropriate control of the disconnect switch 616 may be performed.

Figure 7:
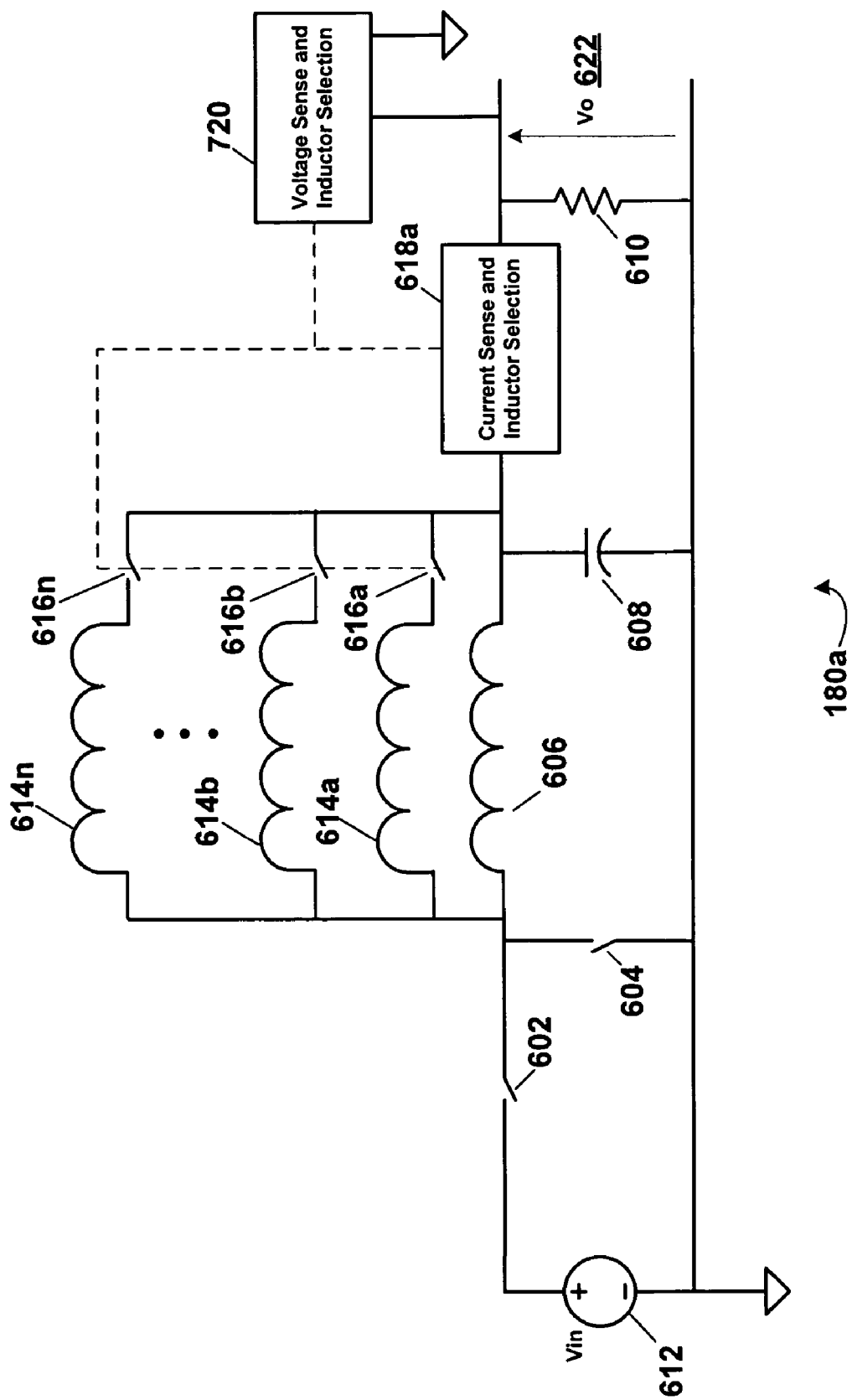
FIG. 7 is a schematic diagram of a DC-to-DC buck converter according to another specific example embodiment of the present disclosure.

Referring to FIG. 7, depicted is a schematic diagram of DC-to-DC buck converter according to another specific example embodiment of the present disclosure. A DC-to-DC buck converter, generally represented by the numeral 180a, comprises a charge switch 602, a discharge switch 604, a first inductor 606, a plurality of second inductors 614a-614n, a plurality of disconnect switches 616a-616n, a filter capacitor 608, and a current sense and inductor selection circuit 618a. Optionally, a voltage sense and inductor selection circuit 720 may be used with the DC-to-DC buck converter 180a.

At a highest output current range, all of the plurality of disconnect switches 616a-616n may be closed, effectively connecting all of the plurality of inductors 614a-614n in parallel with the inductor 606. When all of the plurality of inductors 614a-614n and inductor 606 are in parallel the connected inductance value thereof is smallest and the current carrying (sourcing) capacity is the sum of the current carrying capacities of the inductor 606 and the plurality of inductors 614a-614n.

When the load current drops to a point near the end of a continuous operating mode range for all of the plurality of inductors 614a-614n and the inductor 606 connected in parallel, the current sense and inductor selection circuit 618a may cause one or more of the plurality of disconnect switches 616a-616n to open, thus disconnecting one or more of the plurality of inductors 614a-614n from the buck converter 180a. In this case, the inductance value is the parallel combination of the inductor 606 and the remaining connected ones of the plurality of inductors 614a-614n and is higher than the inductance value of the parallel connected combination of inductors 606 and 614. As the low end current range for operation in a continuous mode approaches, the current sense and inductor selection circuit 618a may cause another one of the plurality of disconnect switches 616a-616n to open, thus disconnecting another one of the plurality of inductors 614a-614n from the buck converter 180a.

It is contemplated and within the scope of the present disclosure that the current sense and inductor selection circuit 618a may also sense current through the charge switch 602, the discharge switch 604, the inductor 606 and/or the inductors 614a-614n when determining whether the buck converter 180a is operating in a continuous or discontinuous mode so that appropriate control of the disconnect switches 616a-616n may be performed.

These configurations of various numbers of connected inductors 614a-614n may extend the low end ranges of load current demand such that the buck converter 180a remains in a continuous operating mode over a much greater range of load currents. As the load current increases to a certain higher value, the current sense and inductor selection circuit 618a may cause open ones of the plurality of disconnect switches 616a-616n to close, thus decreasing the inductance value (more of the inductors 614 connected in parallel with inductor 606 ) and may thereby increased the high end load current available from the buck converter 180a.

The voltage sense and inductor selection circuit 720 may optionally control operation of the plurality of disconnect switches 616a-616n in combination with or separately from the current sense and inductor selection circuit 618a. When the load current goes out of a continuous operating mode range for a certain parallel connected combination of inductors 606 and 614, the level of the output voltage 622 may be affected, e.g., increased voltage ripple, voltage droop, voltage increase (overshoot), etc. The voltage sense and inductor selection circuit 720 may assist and/or supplement the current sense and inductor selection circuit 618a in controlling the plurality of switches 616a-616n. Thus, some combination of inductors 614a-614n and 606 may be connected together to achieve an inductance value appropriate for maintaining substantially optimal continuous mode operation of a DC-to-DC buck converter over a wide range of load currents.

The inductors 606 and/or inductors 614a-614n may have binary weighted inductance values such that the inductors 606 and/or 614a-614n may be coupled in approximately binary increments, e.g., $2^n$, where n is zero (0) or positive integer value. The plurality of inductors 614a-614n may be coupled in series with the inductor 606 (series connections not shown) so that the series coupled inductors additive to the inductance value. The plurality of disconnect switches 616a-616n may be coupled to the plurality of inductors 614a-614n so as to short out selected ones when a lower inductance value is desired of the series connected plurality of inductors 614a-614n.

The charge switch 602 and disconnect switch(es) 616 may be transistors, e.g., bipolar power, or a field effect transistor (FET), e.g., power VFET, power MOSFET, etc. The discharge switch 604 may be a diode, and/or transistor. The first inductor 604 and/or second inductor 614 may be a toroid wound inductor, air wound inductor, ferrite core wound inductor, iron powder core wound inductor, pot core wound inductor, etc. The plurality of inductors may also be coupled together in series and parallel combinations.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus for extending a continuous mode of operation for a buck converter, comprising:

a single charge switch adapted for coupling to a direct current voltage source;

a first inductor coupled to the charge switch;

a single discharge switch coupled to the single charge switch and the first inductor;

a second inductor;

a single disconnect switch adapted for coupling the second inductor in parallel with the first inductor;

a filter capacitor coupled to the first inductor and the single disconnect switch; and a current sense and inductor selection circuit, wherein the current sense and inductor selection circuit measures at least one current in the buck converter and controls operation of the single disconnect switch such that the first and second inductors are coupled in parallel when the measured at least one current is greater than a certain current, and wherein the at least one current is an output load current from the buck converter.

2. The apparatus according to claim 1, wherein the certain current is a minimum current required for the buck converter to operate in the continuous mode.

3. The apparatus according to claim 1, wherein the single charge switch is a transistor.

4. The apparatus according to claim 3, wherein the transistor is selected from the group consisting of bipolar transistor and field effect transistor.

5. The apparatus according to claim 1, wherein the single discharge switch is a diode.

6. The apparatus according to claim 1, wherein the second inductor is not coupled in parallel with the first inductor when the output load current is less than or equal to the certain current value.

7. The apparatus according to claim 1, wherein the single disconnect switch is a transistor.

8. The apparatus according to claim 1, wherein the at least one current is selected from the group consisting of a current through the single charge switch, the first inductor, the single discharge switch, the second inductor, and any combination thereof.

9. An information handling system having a power supply according to claim 1.

10. A method for extending a continuous mode of operation for a buck converter, said method comprising the steps of:

coupling a single charge switch to a direct current voltage source;

charging a first inductor through the single charge switch;

discharging the first inductor with a single discharge switch;

filtering an output voltage of the first inductor with a filter capacitor; and coupling a second inductor in parallel with the first inductor with a single disconnect switch when a current in the buck converter is greater than a certain current, wherein the current is an output load current from the buck converter.

11. The method according to claim 10, wherein the current in the buck converter is determined with a current sense and inductor selection circuit.

12. The method according to claim 10, wherein the certain current is a minimum current required for the buck converter to operate in the continuous mode.

13. The apparatus according to claim 10, wherein the current is selected from the group consisting of a current through the single charge switch, the first inductor, the single discharge switch, the second inductor, and any combination thereof.

* * * * *